US011446688B2

(12) United States Patent
Mösli et al.

(10) Patent No.: US 11,446,688 B2
(45) Date of Patent: Sep. 20, 2022

(54) DELIVERY UNIT FOR DISPENSING ADHESIVE (71) Applicant: Robatech AG, Muri (CH)

(72) Inventors: Urs Mösli, Winterthur (CH); Christoph Käppeli, Merenschwand (CH); Martin Meier, Besenbüren (CH)

(73) Assignee: ROBATECH AG, Muri (CH)

( * ) Notice: Subject to any disclaimer, the term of this patent is extended or adjusted under 35 U.S.C. 154(b) by 436 days.

(21) Appl. No.: 16/806,106

(22) Filed: Mar. 2, 2020

(65) Prior Publication Data

US 2020/0290070 A1   Sep. 17, 2020

(30) Foreign Application Priority Data

Mar. 11, 2019  (EP) .................................... 19162002

(51) Int. Cl.
*B05B 9/00* (2006.01)
*B05B 9/01* (2006.01)
*B05C 11/10* (2006.01)

(52) U.S. Cl.
CPC ................ *B05B 9/002* (2013.01); *B05B 9/01* (2013.01); *B05C 11/1042* (2013.01)

(58) Field of Classification Search
CPC .. B05B 9/01; B05B 9/002; B05B 1/24; B05B 7/16; B05C 11/1042

(Continued)

(56) References Cited

U.S. PATENT DOCUMENTS 4,983,109 A * 1/1991 Miller .................. B05C 5/0279
   239/125
5,458,291 A * 10/1995 Brusko ................ B05B 7/0861
   239/433

(Continued)

FOREIGN PATENT DOCUMENTS

| DE | 20 2006 014586 U1 | 2/2008 |
| EP | 1 439 916 A1 | 5/2003 |
| ES | 2 325 610 A1 | 9/2009 |

OTHER PUBLICATIONS

European Patent Office, European Search Report and Written Opinion, dated Sep. 25, 2019 (dated Sep. 25, 2019), 8 pages, European Patent Office, Munich, Germany.

(Continued)

*Primary Examiner* — Steven J Ganey
(74) *Attorney, Agent, or Firm* — Christopher C. Dremann, P.C.; Christopher C. Dremann (57) ABSTRACT A delivery unit for dispensing adhesive having a housing, a melting apparatus arranged within the housing for melting the adhesive, a distributing device for dispensing molten adhesive in at least one line connectable to the distributing device, and a pump for conveying the molten adhesive through the distributing device, wherein the housing has a plurality of outer side faces, two of the outer side faces are of a flat configuration and arranged perpendicular to a support plane of the delivery unit on a base and substantially at a right angle to each other, and wherein the distributing device, in a region in which the line is connectable to a connector of the distributing device, has a boundary surface of a flat configuration. The two outer side faces are arranged at a distance apart with the boundary surface therebetween forming an obtuse angle with each of the two outer side faces.

20 Claims, 5 Drawing Sheets (58) Field of Classification Search
USPC .............. 239/125, 128, 132, 133, 135, 298
See application file for complete search history.

(56) References Cited

U.S. PATENT DOCUMENTS

| | | | |
|---|---|---|---|
| 6,540,831 B1* | 4/2003 | Craine .................. | B05C 5/0275 |
| | | | 239/298 |
| 8,445,061 B2* | 5/2013 | McGuffey ............. | B05C 5/0225 |
| | | | 222/61 |

OTHER PUBLICATIONS

GRACO Inc., Instructions—Parts InvisiPac HM25c Hot melt Delivery System, Sep. 2019, 102 pages, 3A4938F EN Revision F, Minneapolis, MN, USA.
GRACO Inc., Anleitung—Teile InvisiPac HM25c Heißschmelz-Zufuhrsystem, Nov. 2017, 102 pages, 3A5395C DE Ausgabe (Revision) C, Minneapolis, MN USA.
GRACO Inc., Anleitung—Teile InvisiPac HM25 und HM50 Tank-Free Heißschmelz-Zufuhrsystem, Jan. 2017, 150 pages, 334950M DE Ausgabe (Revision) M, Minneapolis, MN USA.
GRACO Inc., Instructions—Parts InvisiPac HM25 and HM50 Tank-Free Hot Melt Delivery System, Jul. 2015, 142 pages, 333347G EN Revision G, Minneapolis, MN USA.
ROBATECH AG, Originalbetriebsanleitung Schmelzgerät Concept C, Feb. 2018, 118 pages, Ausgabe (Edition) 2.1, info@robatech.com, www.robatech.com, Muri, Switzerland.

* cited by examiner

DELIVERY UNIT FOR DISPENSING ADHESIVE

FIELD OF THE INVENTION

The invention relates to a delivery unit for dispensing adhesive, having a housing, a melting apparatus arranged within the housing for melting the adhesive, a distributing device for dispensing molten adhesive into at least one line connectable to the distributing device, and a pump for conveying the molten adhesive through the distributing device, wherein the housing has a plurality of outer side faces, wherein two of the side faces are of flat configuration and the two side faces are arranged perpendicular to a support plane of the delivery unit on a base and are arranged substantially at a right angle to each other, and wherein the distributing device, in a region in which the line is connectable to a connector of the distributing device, has a boundary surface of flat configuration.

The line which is connectable to the distributing device and into which the molten adhesive can be dispensed by the distributing device is constituted, in particular, by a heating tube, thus a heatable tube, so that the molten adhesive dispensed from the distributing device does not cool as it is conveyed through the line or heating tube to an adhesive applicator.

BACKGROUND OF THE INVENTION AND RELATED ART

Delivery units for dispensing adhesive are generally configured such that a boundary surface for the connection of the line is positioned parallel to one of the two principal axes of the delivery unit. The lead-off direction of the line is thus largely dependent on the orientation of the footprint of the delivery unit. Lines lead, for instance, in the extension of the delivery unit away from the latter, thus in particular rearward, or else transversely to the longitudinal axis, thus laterally. However, the installation of such a delivery unit into a main functional unit, for instance a packaging machine, is hereby restricted or already predetermined. It can be absolutely necessary to rotate a delivery unit through 90° in order to achieve a situation in which a line which is normally led away to the rear can now be led away to the side in relation to the packaging machine. Without rotation of the entire delivery unit, the line cannot sensibly be led away in this new direction. If the delivery unit is not to be rotated through 90°, the line would then have to be connected by means of a 90° screw joint. This is extremely detrimental to the flow of adhesive.

A delivery unit which exhibits the features of the type stated herein is known from EP 1 439 916 A1. There, a delivery unit for the delivery of adhesive is described. The delivery unit has a housing with front side, back side, left and right side parts, a distributing device having an inlet in fluid communication with a source of adhesive and a plurality of outlets, which are respectively suitable for the connection of a tube, and a pump for conveying the adhesive through the distributing device. The distributing device is herein positioned centrally between the left and right side part of the housing, so that the plurality of outlets are substantially equidistant from the left and right side part. In this arrangement, it is disadvantageous that, for the connection of the heating tubes to the heat distributing device, connectors which are angled off by 90° must always be used. Normally, in the case of 90° connectors, relatively long regions which are not heated and not insulated are present. During operation, the adhesive temperature in the region of the deflections thus markedly declines. During the heat-up process, the major drawback ensues that, given these unheated deflections, the adhesive becomes liquid right at the end. Unfavorable and destructive pressure peaks arise during the heat-up process and the heat-up time can be significantly extended, and thus handicap the user in terms of his productivity.

In ES 2 325 610 A1 is described a delivery unit for the delivery of adhesive, which has a housing with front side, back side, left and right side parts, and also a distributing device having an inlet in fluid communication with a source of adhesive and having a plurality of outlets which are respectively suitable for the connection of a tube, as well as a pump for conveying the adhesive through the distributing device. This delivery unit is able to be used for two lead-off directions of the tubes. However, when the lead-off direction is changed, the delivery unit has to be converted, from the rearward lead-off direction to the sideways lead-off direction, or from the sideways lead-off direction to the rearward lead-off direction.

In "Originalbetriebsanleitung Schmelzgerat Concept C, Ausgabe 2.1", Gesamtdokumentation Art. Nr. 156392, Originalbetriebsanleitung Art. Nr. 156394, date of issue February 2018, Robatech AG, Pilatusring 10, 5630 Muri, Switzerland, is shown a melting apparatus having a rear back side in the region of which is arranged a distributing device for dispensing molten adhesive into maximally two lines connectable to the distributing device. In this, the distributing device has two flat boundary surfaces. One boundary surface is arranged perpendicular to a support plane of the melting apparatus on a base and is aligned with a rear wall of the melting apparatus, whilst the other boundary surface borders the first-named boundary surface at the top and is arranged inclined forward from this, wherein the boundary surfaces enclose an angle of 135°. The respective connectors of the distributing device enable lines to be connected at different angles in the region of the boundary surfaces, for the purpose of optimal adaptation during assembly.

From "Anleitung-Teile Invisi Pac HM25c Heißschmelz-Züfohrsystem" of GRACO INC. MINNEAPOLIS MN 55440-1441, US, Ausgabe C, November 2017, 3A5395C DE, a melting apparatus for dispensing molten adhesive is known. The melting apparatus has in the region of a side wall a vertical distributing device for the connection of lines, wherein this distributing device has three vertical boundary surfaces, wherein the two outer boundary surfaces form an obtuse angle with the middle boundary surface. The distributing device is arranged at a distance from a corner region of the melting apparatus, between its back side and a thereto adjoining side face, wherein the middle boundary surface is arranged parallel to the side face.

Each boundary surface has two connectors, for the connection of lines or heating tubes.

From "Anleitung-Teile InvisiPac HM25 and HM50 Tank-Free Heißschmelz-Zufuhrsystem" of said company GRACO, 334950M DE, Ausgabe M, January 2017, a further melting apparatus for dispensing molten adhesive is known. The outer contour of this melting apparatus has a multiplicity of wall sections arranged at obtuse angles to one another. In the region of a rear wall section, the melting apparatus is provided with a vertical distributing device for the connection of lines. This distributing device has three vertical boundary surfaces, wherein the two outermost boundary surfaces respectively form an obtuse angle with the middle boundary surface. The distributing device is arranged in a central region of the rear wall section. Each boundary surface has a plurality of connectors, for the connection of the lines.

In known arrangements of delivery units or melting apparatuses and outlets to lines or heating tubes, it is necessary to use 90° screw joints between the distributing device and the lines or heating tubes. The resulting drawbacks have been discussed above.

In some known delivery units, the delivery unit must either be configured in dependence on the lead-off direction of the line and positioned accordingly, or the delivery unit must be appropriately converted. This represents an increased expenditure of time and effort in the planning and ordering of delivery units.

For cost reasons, in many delivery units either the number of possible line outlets is limited or the spatial conditions for the connection of the lines are very cramped. It is then often difficult to connect the lines and to tighten the fastenings with the correct torque. This is made additionally difficult if already used equipment has to be converted, since this must be done in hot state with gloves.

If a plurality of lines, up to as many as eight lines, have to be connected to the same distributing device, the spatial conditions are often very cramped. The lines must then be laid so close together that the ventilation is inadequate, the heat flows of the individual lines are mutually impaired and segments of the lines can overheat.

Depending on the footprint area and the lead-off direction of the lines, one or even two boundary surfaces is/are breached by the footprint of the delivery unit or of the melting apparatus on account of the outgoing lines. This means that, for the installation of the equipment, there is a need for additional space and, for a mechanical engineer who has to integrate the delivery units or melting apparatus into the provided production machinery, additional demands and difficulties exist.

OBJECT AND SUMMARY OF THE INVENTION

The object of the invention is to refine a delivery unit of the type stated in the introduction such that, in the region of the two side faces of the housing of the delivery unit, a bilateral lead-off direction of lines, irrespective of an installation position of the delivery unit, is possible.

The object is achieved by a delivery unit according to the invention as shown and described herein.

In this delivery unit, it is provided that the two side faces are arranged at a distance apart and between these is arranged the boundary surface, which forms an obtuse angle with the respective one of the two side faces.

Between the two side faces is thus positioned that boundary surface of the distributing device in the region of which is arranged the distributing device. There, the line is connectable to the connector of the distributing device. A plurality of connectors for lines can herein perfectly well be arranged in the region of the boundary surface, this being regarded as advantageous.

This arrangement of the boundary surface enables the line to be universally connected to the delivery unit, more specifically the distributing device, such that a connection to one side face or to the other side face, or even, in the case of a plurality of connectors, to both side faces at the same time, is possible. Since the boundary surface forms an obtuse angle with the respective one of the two side faces, a space is formed between two imaginary planes which coincide with the two side faces and the boundary surface, which space enables the line or lines to be connected to the distributing device irrespective of its lead-off direction(s).

The installation of the delivery unit into a machine, or, more generally, the set-up of the delivery unit, is thus flexibly possible. The lead-off direction of the line or lines, preferably, if configured as a heating tube or heating tubes, can be realized multilaterally, irrespective of the installation position of the delivery apparatus. In particular, the currently usual directions, namely to the side and to the rear, can, in this design of the delivery unit, be represented in an uncomplicated manner. Given the principal lead-off directions of the lines from the delivery unit or from the melting apparatus, it can be represented that only one boundary plane is tangented by the footprint of the delivery unit or of the melting apparatus on account of the outgoing line or lines.

By a substantially right angle, at which the two side faces are arranged relative to each other, is understood an angle of 80-100°. Preferredly, this angle is, however, a right angle, thus a 90° angle.

It is regarded as particularly advantageous if the boundary surface is arranged perpendicular to the support plane of the delivery unit on the base on which the delivery unit stands. As a result, not only is this boundary surface easily accessible for the purpose of connecting the line or lines, but this connection is able to be realized with minimally realized clearance between the boundary surface and the two planes coinciding with the two side faces. This clearance thus presents as a solid body having a cross section which is identical over its height and which is defined by the surface of a right-angled triangle. This arrangement of the boundary surface perpendicular to the support plane makes it possible, moreover, in a simple manner, to connect the line or lines, wherein these lead off from the boundary surface, in particular in horizontal orientation.

Preferably, the distributing device, in the region of the boundary surface, borders the housing in the region of the two side faces. This produces an advantageous continuous external structure of the delivery unit in the region of its side faces and of the boundary surface. One side face constitutes, in particular, a left or a right side face or side wall of the delivery unit or melting apparatus, whilst the other side face constitutes a rear wall of the delivery unit or of the melting apparatus. The boundary surface of the distributing device constitutes the connecting structure between the left or right side wall and the rear wall.

It is deemed preferable if the boundary surface is arranged at an angle of 125° to 145° to the respective one of the two side faces. Preferably, the boundary surface is arranged at an angle of 130° to 140°, in particular at an angle of 135°, to the respective one of the two side faces. In the case of a 135° angle, the space circumscribed by the side faces and the boundary surface presents with a base area of an isosceles triangle. The advantage of this design can be seen in the fact that, for a lead-off direction of a line in the direction of one side face or in the direction of the other side face, the same connection conditions for the lines are obtained.

Structurally, the delivery unit is preferably designed such that the housing has a front side face, a rear side face, a right side face and a left side face. In particular, the rear side face and the right side face are arranged perpendicular to each other, and the right side face and the left side face are arranged parallel to each other, and also the front side face and the right side face are arranged perpendicular to each other. The housing hence has a largely rectangular footprint, apart from the particular corner design in the region of one corner of the housing due to the arrangement of the boundary surface. Hence the housing can be of largely cuboid design, apart from the offset, arranged in the region of one vertical edge of the housing, due to the positioning of the boundary surface.

In particular, one of the two side faces is the right or the left side face, and the other of the two side faces is the rear side face.

From structural viewpoints, it is regarded as particularly advantageous if the distributing device is configured as an attachment with respect to the melting apparatus. The distributing device can hence be built in as a self-contained functional component of the delivery unit, in particular by connection to the melting apparatus.

The connector or connectors of the distributing device is/are able to be realized particularly easily and, moreover, also the line or lines is/are able to be connected to the connector or connectors if a longitudinal axis of the respective connector of the distributing device is arranged perpendicular to the boundary surface. Molten adhesive can thus, in this direction perpendicular to the boundary surface, drain out of the distributing device.

The connector of the distributing device can be configured differently. The connector comprises, in particular, a borehole in the distributing device. This borehole is constituted, in particular, by a threaded hole.

The connector of the distributing device can also comprise a socket protruding over the boundary surface. This socket serves, in particular, for the screwing-on or mounting of the line.

In particular, it is provided that the distributing device has in the region of its boundary surface a plurality of connectors, wherein a line is connectable to the respective connector.

According to a preferred embodiment of the delivery unit, it is provided that the distributing device has, at an angle to the boundary surface, at least one further flat boundary surface, wherein the distributing device has in the region of the respective further boundary surface one or more connectors. The advantage of this design can be seen, in particular, in the fact that the variants of the connectors of the delivery unit can be significantly increased. For instance, lines can be connected in the region of one boundary surface or the further boundary surface, or else in the region of both boundary surfaces. In accordance with the favorable access of the respective line to the connector, a connector of the boundary surfaces is selected.

According to another preferred embodiment, it is provided that the further boundary surface is arranged at an acute angle to the support plane of the delivery unit on the base, preferably at an angle of 40° to 70° to the support plane, further preferably at an angle of 40° to 50° to the support plane, in particular at an angle of 45° to the support plane. Whilst one boundary surface is arranged, in particular, perpendicular to the support plane, the further flat boundary surface is arranged, at an angle to a horizontal plane, in a non-vertical plane. Preferably, one boundary surface borders at the top the further boundary surface, in particular along a horizontally running line. By virtue of this design, an optimal accessibility of the distributing device for the purpose of connecting a plurality of lines in the region of the boundary surfaces, whilst claiming the least possible space, is ensured, this in particular from the viewpoint of connecting the lines in different lead-off directions.

The delivery unit according to the invention and its various embodiments offers a wide variety of advantages, including:

For instance, for different lead-off directions of lines or heating tubes, the identical configuration of the delivery unit or of the melting apparatus can be used. For two different main lead-off directions of the line, the lines remain in a region of the delivery unit adjacent to the boundary surface between boundary planes of two outer side faces of the housing. The lines can be connected to the distributing device comfortably, without lack of space. All lines can be connected equally at the required distance apart and guided in parallel.

For the most frequent lead-off directions of the line, preferably straight or 45° connectors can be provided. 90° connectors are not necessary. The connectors to the lines are preferably arranged such that accessibility for connection of the connectors is given and the led-away lines have a sufficiently large separation. An impairment of the heat flow in the lines or heating tubes is thereby avoided. The distributing device and the connectors can be arranged such that the lines or heating tubes do not have to be laid lying on the base.

If all lines are led away from the distributing device in the same direction, it is possible to provide the arrangement such that the lines are led in both cases only through one of the two boundary planes of the delivery unit. The other boundary plane is respectively not tangented. Different lead-off directions of the lines can be combined. From a different number of lines, maximally corresponding to the number of lines, different lead-off directions can thus be realized simultaneously.

With just one configuration of the delivery unit and without conversion of the delivery unit or distributing device, many different lead-off directions of the lines or heating tubes can be realized. The spatial conditions for the connection of the lines are designed generously. This makes it easier to connect the lines or to tighten fastenings with the correct torque.

To the extent that all lines are led away in the same direction, for most and the most common lead-off directions of the lines or heating tubes, only one boundary plane is breached by the footprint of the delivery unit or of the melting apparatus on account of the outgoing lines. This means that, for different lead-off directions for the installation of the equipment, no additional space requirement exists and, for the mechanical engineer who integrates the delivery unit into a production machine, for the arrangement of the delivery unit or melting apparatus, and the lead-off direction of the lines, significantly more flexibility exists. In the planning of the production machine, not every detail has to be fixed in advance.

The connection between distributing device and line or tube can be realized differently. A screw joint can be provided between distributing device and line, or else a plug-in coupling in the form of a snap fastener.

The distributing device can have a wide variety of arrangements of the connectors, in particular an arrangement of hole patterns. The distance apart of the lines or tubes can thereby be optimized. Also the number of connectors for the line or heating points can be optimized on the basis of requirements. In particular, plug-in couplings are used for the connection of the lines. In order to make it easier for the lines or heating tubes to be led away upward, the uppermost and lowermost connectors for the lines or heating tubes can be set back.

In addition, plug sockets for cables of the heating tubes can be arranged. Further components, such as filters, overpressure valves, pressure relief valves, can be provided.

Further features and advantages of the invention are shown in the accompanying drawing figures and illustrated by the detailed description of exemplary embodiments provided herein, wherein it is noted that all individual features and all combinations of individual features are encompassed by the invention.

BRIEF DESCRIPTION OF THE DRAWING FIGURES

In the accompanying drawing figures, the invention is illustrated on the basis of a plurality of exemplary embodiments, without being confined thereto.

DETAILED DESCRIPTION OF EXEMPLARY EMBODIMENTS OF THE INVENTION

FIGS. 1 to 6 show a delivery unit 1 for dispensing adhesive. The delivery unit 1 comprises a housing 2, a melting apparatus arranged within the housing 2 for melting the adhesive, a distributing device 3 for dispensing molten adhesive in at least one line connectable to the distributing device 3, and a pump 4 for conveying the molten adhesive through the distributing device 3 and from there through the line.

The housing 2 has, in relation to control elements of the delivery unit 1 that are arranged in the region of a front side face 5, the front side face 5, a rear side face 6, a right side face 7 and a left side face 8. The side faces 5 to 8 are respectively arranged perpendicular to a support plane 45 of the delivery unit 1 on a base on which the delivery unit 1 stands. The rear side face 6 and the right side face 7 are arranged perpendicular to each other. The right side face 7 and the left side face 8 are arranged parallel to each other. The front side face 5 and the right side face 7 are arranged perpendicular to each other.

The distributing device 3 has, in a region in which lines 9, in the above case eight heating tubes, are connectable to a connector 10 of the distributing device 3 that is assigned to the respective line 9, a boundary surface 11, which is of flat configuration. The rear side face 6 and the right side face 7 are arranged at a distance apart, and between these there is arranged the boundary surface 11 of the distributing device 3. This boundary surface forms with the right side face 7 an obtuse angle, and also with the rear side face 6 an obtuse angle. In the specific exemplary embodiment, the respective obtuse angle measures 135°.

The housing 2 further has an upper face 12 and a lower face 13. In the region of the lower face 13 are positioned baseboards 14, which are arranged parallel with the housing 2 and at a distance apart and which, in the region of the base on which the delivery unit 1 stands, are connectable to the base.

The boundary surface 11 is arranged perpendicular to the support plane 45 of the delivery unit 1 on the base. The distributing device 3 borders in the region of the boundary surface 11 the housing 2, in the region of the side faces 6 and 7.

The distributing device 3 is configured as an attachment with respect to the melting apparatus, and is preferably connected thereto.

The respective connector 10 of the distributing device 3 is positioned such that a longitudinal axis 15 of the respective connector 10 is arranged perpendicular to the boundary surface 11.

More specifically, the illustrated eight lines 9, thus the eight heating tubes, are connected to the distributing device 3 such that they lead off horizontally, wherein respectively two lines 9 are arranged side by side and respectively four lines 9 are arranged one above another. The lines 9 arranged side by side are arranged in the same horizontal plane, and the four lines 9 arranged one above another are arranged in the same vertical plane. The two vertical planes run parallel to each other, just as the four horizontal planes are arranged parallel to one another.

Beneath the distributing device 3 are arranged electrical connectors 16, which are connected to components for controlling the delivery unit 1.

As regards the exemplary embodiments according to FIGS. 1 to 6, the outlined delivery unit 1 is identical, so that, with respect to the representation of FIGS. 3 to 6, reference is made to the above statements. The exemplary embodiments according to FIGS. 3 to 6 differ from the exemplary embodiments according to FIGS. 1 and 2 only by a changed lead-off direction of the lines 9.

Figure 1:
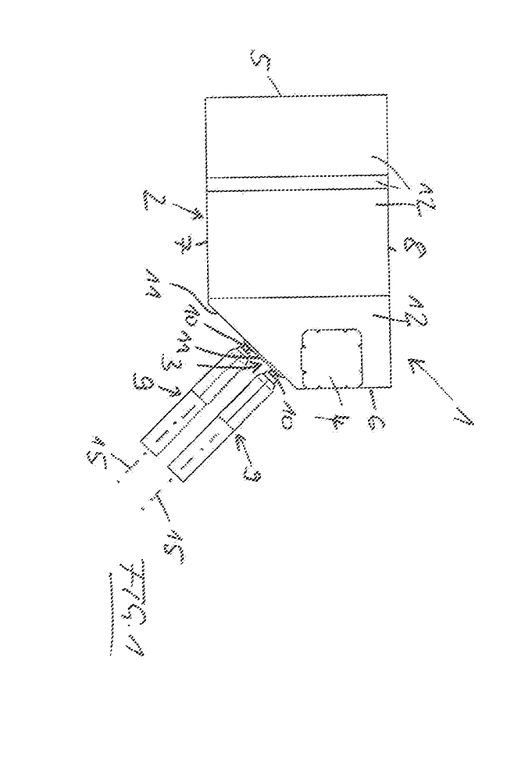
FIG. 1 shows a delivery unit for dispensing molten adhesive, represented in a top view, wherein to a distributing device of the delivery unit are connected a plurality of lines configured as heating tubes.
Figure 2:
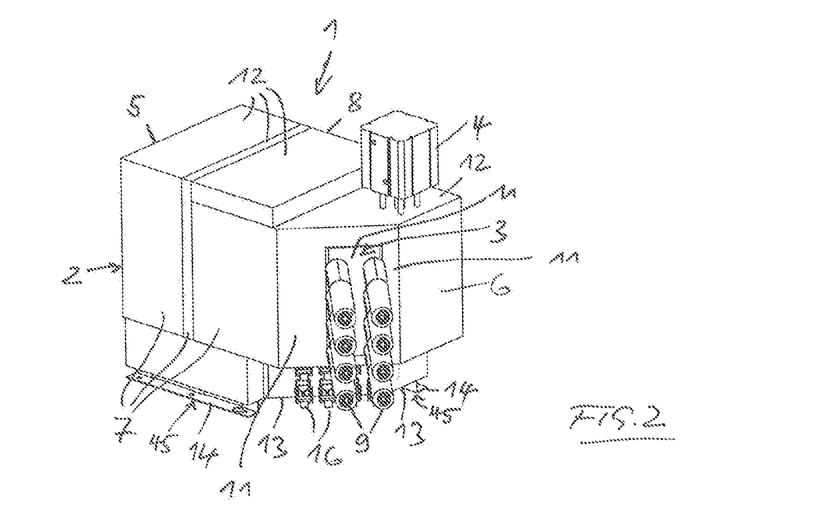
FIG. 2 shows the delivery unit according to FIG. 1 in a three-dimensional representation.

In the exemplary embodiment according to FIGS. 1 and 2, the eight lines 9 are oriented such that the longitudinal axes 15 of the connectors 10 coincide with the longitudinal axes of the lines 9.

Figure 3:
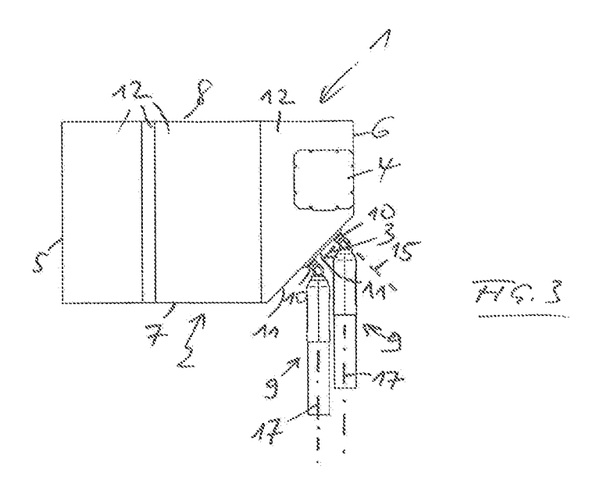
FIG. 3 shows a representation of the delivery unit according to FIG. 1, yet with a modified arrangement of the lines.
Figure 4:
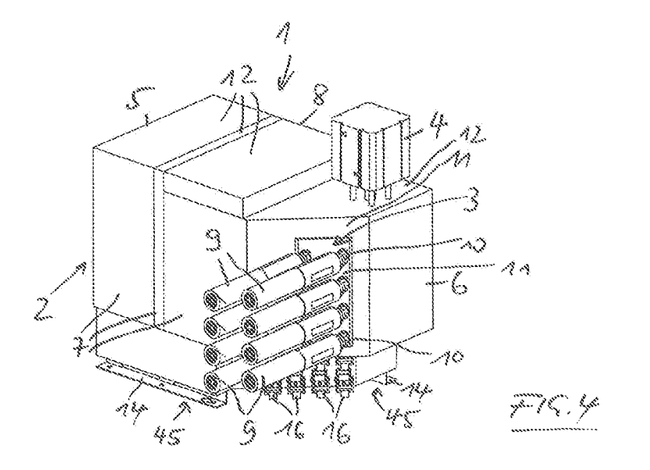
FIG. 4 shows the delivery unit according to FIG. 3 in a three-dimensional representation.
Figure 5:
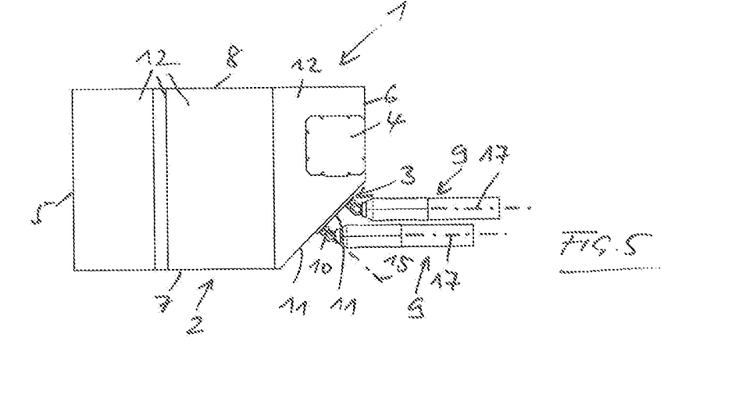
FIG. 5 shows a representation of the delivery unit according to FIG. 1, yet with another modified arrangement of the lines.
Figure 6:
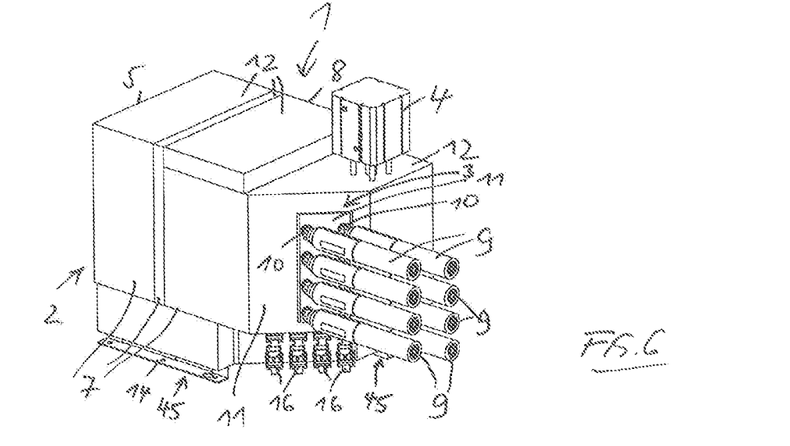
FIG. 6 shows the delivery unit according to FIG. 5 in a three-dimensional representation.

The exemplary embodiment according to FIGS. 3 and 4 differs from that according to FIGS. 1 and 2 in that the longitudinal axis 17 of the respective line 9 is angled off from the longitudinal axis 15 of the associated connector 10 by an angle of 45°, and the longitudinal axes 17 run parallel to the rear side face 6. The exemplary embodiment according to FIGS. 5 and 6 differs from that according to FIGS. 1 and 2 in that the longitudinal axis 17 of the respective line 9 is arranged angled-off by 45° in opposite direction to the longitudinal axis 15 of the respective connector 10, so that the longitudinal axes 17 are arranged parallel to the right side face 7. The angling-off is respectively realized by a correspondingly angled-off design of the respective connector.

FIGS. 1 to 6 illustrate that, due to the fact that the boundary surface 11 coincides neither with the rear side face 6 nor with the right side face 7 or left side face 8, either no angling-off of the connectors 10, or maximally a 45° angling-off of the connectors 10, is necessary in order to ensure a defined discharge of the adhesive through the lines 9 by means of the pump 4. In particular according to the exemplary embodiments according to FIG. 3, 4 or 5, 6, only one boundary plane of the housing 2, thus a plane coinciding with a side face, is in this case claimed for the leading-off of the lines, namely, in the exemplary embodiment according to FIGS. 3 and 4, a boundary plane which forms a plane with the right side face 7 and, as regards the exemplary embodiment according to FIGS. 5 and 6, a boundary plane which forms a plane with the rear side face 6. Irrespective of the respective lead-off directions of the lines 9, the delivery unit 1 can remain in the provided set-up position. Moreover, in the space which borders the boundary surface 11 and which is enclosed by the boundary surface 11 and boundary planes of the right side face 7 and of the rear side face 6, sufficient space for connecting the diverse, in the present case eight lines 9, to the associated connectors 10 is ensured.

Figure 7:
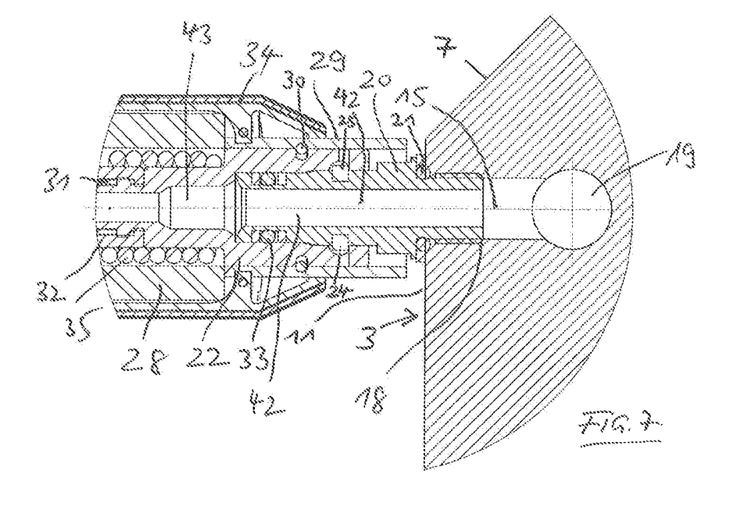
FIG. 7 shows in a sectional representation details of the connection of one heating tube of the heating tubes shown in FIGS. 1 to 6 to a connector of the distributing device.

FIG. 7 illustrates in a sectional representation the connection of a line 9, configured as a heating tube, via a secured plug-in coupling to a connector 10 of the distributing device 3. For this connection region is shown that boundary surface 11 of the distributing device 3 which forms the angle of 135° with the right side face 7 of the housing 2. In this exemplary embodiment, the boundary surface 11 has adjacent to the right side face 7 a threaded hole 18, the longitudinal axis of which corresponds to the longitudinal axis 15 and is hence arranged perpendicular to the boundary surface 11. The longitudinal axis of the line 9 coincides with the longitudinal axis 15, whereby, in FIG. 7, the connector according to the variant according to FIGS. 1 and 2 is illustrated. The threaded hole 18 is fluidically connected to a collecting duct 19 of the distributing device 3. Through this collecting duct 19 and the diverse threaded holes 18, the molten adhesive is fed to the lines 9.

Figure 8:
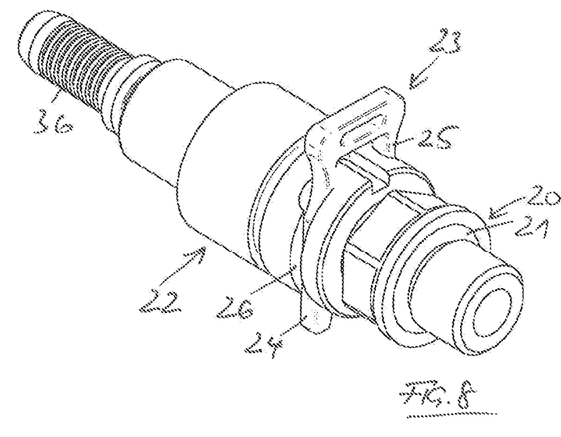
FIG. 8 shows in a three-dimensional view, as regards the connection according to FIG. 7, the directly interconnected parts of the connector and the heating tube.
Figure 9:
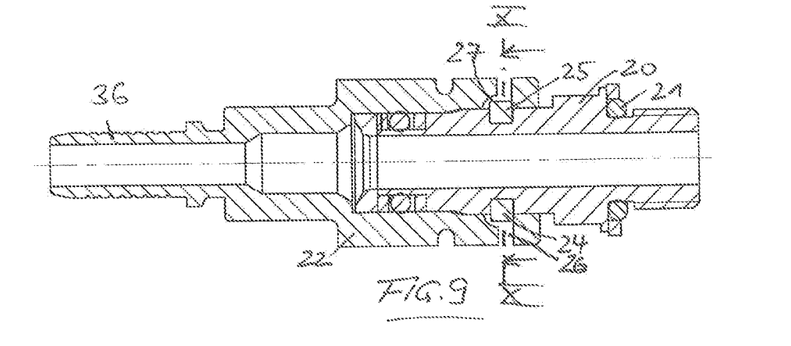
FIG. 9 shows a section through the arrangement according to FIG. 8, along the line IX-IX in FIG. 10.
Figure 10:
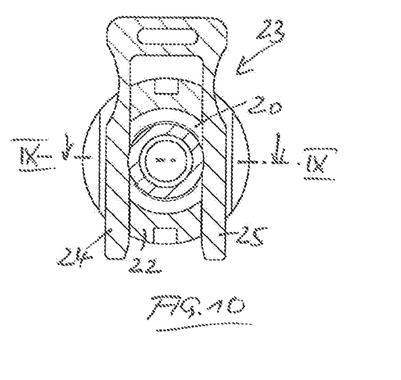
FIG. 10 shows a section through the arrangement according to FIG. 8, along the line X-X in FIG. 9.

Into the threaded hole 18 is screwed a plug-in connector 20 and, via a sealing ring 21, the plug-in connector 20 is sealed off from the distributing device 3. Onto the plug-in connector 20 is fitted a hose adapter 22 of the line 9 or heating tube in the direction of the longitudinal axis 15 and is fixed in the direction of the longitudinal axis 15 by means of a U-shaped retaining wedge 23. The retaining wedge 23 engages with legs 24, 25 in slit-shaped recesses 26, 27 of the hose adapter 22. In this respect, reference is additionally made to the representation of FIGS. 8 to 10, which illustrate in detail the connection of plug-in connector 20 and hose adapter 22 and the securement via the retaining wedge 23.

The plug-in connector 20 has a passage 42 and the hose adapter 22 a passage 43, which are respectively arranged such that they are rotationally symmetric with respect to the longitudinal axis 15.

As regards the arrangement which is represented in FIGS. 7 to 10, an insulation 28 of the heating tube, and an insulating sleeve 29 which radially encloses the hose adapter 22 and is fixed axially with respect to the hose adapter 22 by way of a locking ring 30, are additionally illustrated. A high-pressure hose 31 is slipped onto the hose adapter 22 in the region of its end 36 and connected there to the hose adapter 22 by means of a compression sleeve 32. In the region of that end of the plug-in connector 20 that is facing away from the distributing device 3, said plug-in adapter receives a sealing ring 33 for sealing plug-in connector 20 and hose adapter 22 in this region. A shell 34 radially encloses the insulating sleeve 29 and the insulation 28. With the reference numeral 35 is denoted a coiled heating conductor of the heating tube. The line 9 or heating tube is gripped in the region of the shell 34, and the hose adapter 22 fitted onto the plug-in connector 20 into a sealing position in which the retaining wedge 23 can be inserted, so that the hose adapter 22 is axially fixed with respect to the plug-in connector 20.

Figure 11:
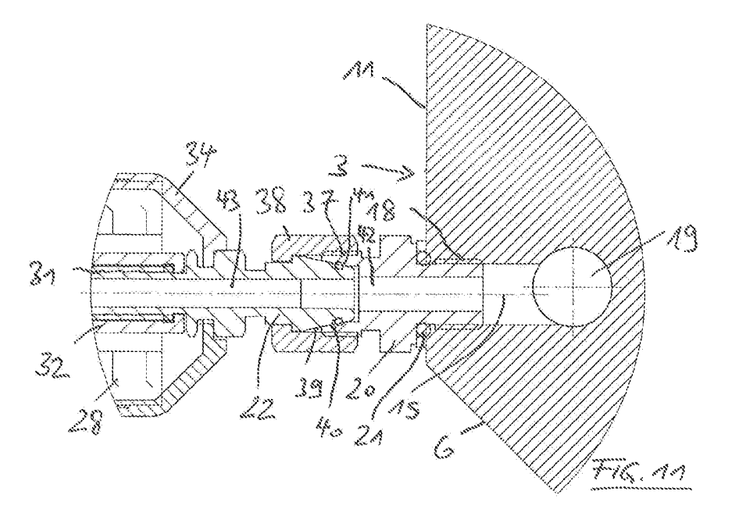
FIG. 11 shows an alternative connection of a connector of the distributing device and the heating tube, in a sectional representation corresponding to FIG. 7.

FIG. 11 shows, in contrast to the plug-in connector according to FIGS. 7 to 10, a screw connection of the respective line 9 or respective heating tube. According to the exemplary embodiment according to FIG. 11, a modified plug-in connector 20 is screwed into the threaded hole 18 and sealed by way of the sealing ring 21. That end of the plug-in connector 20 that is facing away from the threaded hole 18 is provided with an external thread 37. A modified hose adapter 22 receives a nut 38, which can be screwed onto the plug-in connector 20 in the region of the external thread 37. In the screw-on process, the hose adapter is moved with a conical contact surface 39 against a conical contact surface 40 of the plug-in connector 20. Between the two contact surfaces 39, 40 is arranged a sealing ring 41.

In the exemplary embodiments according to FIGS. 3 to 6, the plug-in connectors 20 described in connection with FIGS. 7 to 11 are configured with greater length and are angled off by 45° in their longitudinal direction, so that the portion of the plug-in connector 20 that is screwed into the threaded hole 18 has the longitudinal axis 15, and so that the portion of the plug-in connector 20 that is connected to the hose adapter 22 has the longitudinal axis 17.

Figure 12:
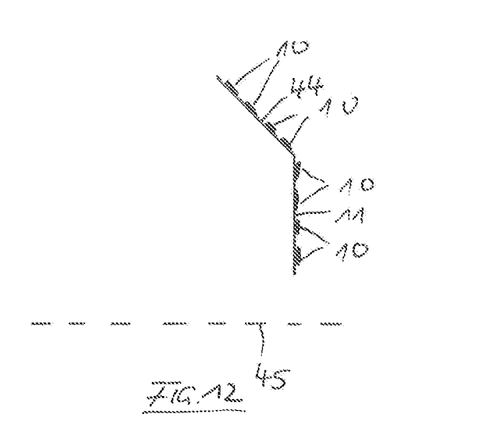
FIG. 12 shows in schematic representation an arrangement of a boundary surface with connectors and a further boundary surface with connectors, in an alternative exemplary embodiment of a delivery unit.

FIG. 12 shows in a schematic representation a modification of the delivery unit 1 such that this delivery unit not only has the flat boundary surface 11, but possesses a further flat boundary surface 44 which borders at the top of the boundary surface 11. The boundary surface 11 is arranged perpendicular to the support plane 45, and the further boundary surface 44 forms an angle of 135° with the boundary surface 11, and is thus arranged at an angle of 45° to the support plane 45. The further boundary surface 44 is arranged directed forward, thus in the direction of the front side face 5. For both boundary surfaces 11 and 44, connectors 10 are illustrated, wherein the connectors 10 of the respective boundary surface 11 or 44 can be arranged in accordance with the connectors 10 of the exemplary embodiments according to FIGS. 1-6.

That which is claimed is:

1. A delivery unit for dispensing adhesive, comprising a housing, a melting apparatus arranged within the housing for melting the adhesive, a distributing device for dispensing molten adhesive in at least one line connectable to the distributing device, and a pump for conveying the molten adhesive through the distributing device, wherein the housing has a plurality of outer side faces, wherein two of the outer side faces are of a flat configuration and are arranged perpendicular to a support plane of the delivery unit on a base and substantially at a right angle to each other, wherein the distributing device, in a region in which the line is connectable to a connector of the distributing device, has a boundary surface of flat configuration, wherein the two outer side faces are arranged at a distance apart and between the two outer side faces is arranged the boundary surface, which forms an obtuse angle with a respective one of the two outer side faces.

2. The delivery unit as claimed in claim 1, wherein the two outer side faces are arranged at an angle of 80-100° to each other.

3. The delivery unit as claimed in claim 2, wherein the two outer side faces are arranged at an angle of 90° to each other.

4. The delivery unit as claimed in claim 1, wherein the boundary surface is arranged perpendicular to the support plane.

5. The delivery unit as claimed in claim 1, wherein the distributing device, in the region of the boundary surface, borders the housing in the region of the two outer side faces.

6. The delivery unit as claimed in claim 1, wherein the boundary surface is arranged at an angle of 125° to 145° to the respective one of the two outer side faces.

7. The delivery unit as claimed in claim 6, wherein the boundary surface is arranged at an angle of 135° to the respective one of the two outer side faces.

8. The delivery unit as claimed in claim 1, wherein the housing has a front side face, a rear side face, a right side face and a left side face, and wherein the rear side face and the right side face are arranged perpendicular to each other, the right side face and the left side face are arranged parallel to each other, and the front side face and the right side face are arranged perpendicular to each other.

9. The delivery unit as claimed in claim 8, wherein one of the two outer side faces is the right side face or the left side face, and the other of the two outer side faces is the rear side face.

10. The delivery unit as claimed in claim 1, wherein a longitudinal axis of the connector of the distributing device is arranged perpendicular to the boundary surface.

11. The delivery unit as claimed in claim 1, wherein the connector of the distributing device comprises a threaded hole in the distributing device.

12. The delivery unit as claimed in claim 1, wherein the connector of the distributing device comprises a plug-in connector protruding over the boundary surface for secured mounting of the line.

13. The delivery unit as claimed in claim 12, wherein a socket region, facing away from the boundary surface, of the plug-in connector, has a longitudinal axis, which is arranged perpendicular to the boundary surface or is arranged at an angle of 40° to 60° to the boundary surface.

14. The delivery unit as claimed in claim 13, wherein the longitudinal axis is arranged at an angle of 45° to the boundary surface.

15. The delivery unit as claimed in claim 1, wherein a plurality of plug-in connectors are provided that each protrude over the boundary surface and which, given identical angular arrangement with respect to the boundary surface, are identically oriented.

16. The delivery unit as claimed in claim 1, wherein the distributing device, in the region of the boundary surface, has a plurality of connectors, and wherein to the respective connector a corresponding line is connectable.

17. The delivery unit as claimed in claim 1, wherein the distributing device has, at an angle to the boundary surface, at least one further flat boundary surface, and wherein the distributing device has in the region of the further flat boundary surface one or more connectors, and wherein the boundary surface and the further flat boundary surface border one another.

18. The delivery unit as claimed in claim 17, wherein the further flat boundary surface is arranged at an acute angle to the support plane of 40° to 70°.

19. The delivery unit as claimed in claim 18, wherein the further flat boundary surface is arranged at an acute angle to the support plane of 45°.

20. The delivery unit as claimed in claim 17, wherein the boundary surface and the further flat boundary surface border one another.

* * * * *